US011958978B2

(12) United States Patent
Hayakawa et al.

(10) Patent No.: US 11,958,978 B2
(45) Date of Patent: Apr. 16, 2024

(54) COLORING COMPOUND AND THERMAL TRANSFER RECORDING SHEET

(71) Applicant: CANON KABUSHIKI KAISHA, Tokyo (JP)

(72) Inventors: Ai Hayakawa, Ashigarakami-gun (JP); Masanori Seki, Yokohama (JP); Koromo Shirota, Kawasaki (JP); Hajime Muta, Zama (JP); Taichi Shintou, Saitama (JP); Tsuyoshi Santo, Yokohama (JP)

(73) Assignee: Canon Kabuskiki Kaisha, Tokyo (JP)

( * ) Notice: Subject to any disclaimer, the term of this patent is extended or adjusted under 35 U.S.C. 154(b) by 950 days.

(21) Appl. No.: 16/879,035

(22) Filed: May 20, 2020

(65) Prior Publication Data

US 2020/0283633 A1 Sep. 10, 2020

Related U.S. Application Data

(63) Continuation of application No. PCT/JP2018/043108, filed on Nov. 22, 2018.

(30) Foreign Application Priority Data

Nov. 29, 2017 (JP) ................................ 2017-229293
Oct. 19, 2018 (JP) ................................ 2018-197292

(51) Int. Cl.

| | |
|---|---|
| ***C09B 55/00*** | (2006.01) |
| ***B41M 5/385*** | (2006.01) |
| ***C09B 1/20*** | (2006.01) |
| ***C09B 11/12*** | (2006.01) |
| ***C09B 57/00*** | (2006.01) |

(52) U.S. Cl.
CPC ......... *C09B 55/009* (2013.01); *B41M 5/3858* (2013.01); *C09B 1/201* (2013.01); *C09B 11/12* (2013.01); *C09B 57/008* (2013.01)

(58) Field of Classification Search
CPC .... B41M 5/3858; C09B 55/009; C09B 1/201; C09B 11/12; C09B 57/008
USPC ........................................................ 428/32.75
See application file for complete search history.

(56) References Cited

U.S. PATENT DOCUMENTS 3,538,105 A 11/1970 Yamaya et al.
5,550,098 A * 8/1996 Aso ...................... B41M 5/3858 503/227
6,156,471 A * 12/2000 Kobori .................. G03G 9/097 430/119.71
9,592,695 B2 3/2017 Katsumoto et al.
(Continued)

FOREIGN PATENT DOCUMENTS

JP 45-33556 B 10/1970
JP 52-113739 A 9/1977
(Continued)

OTHER PUBLICATIONS

International Preliminary Report on Patentability in International Application No. PCT/JP2018/043108 (dated Jun. 2020).
(Continued)

*Primary Examiner* — Betelhem Shewareged
(74) *Attorney, Agent, or Firm* — Venable LLP

(57) ABSTRACT

A coloring compound comprises a triphenylmethane structure having specific substituents.

8 Claims, 1 Drawing Sheet

(56) References Cited

U.S. PATENT DOCUMENTS

| | | | | |
|---|---|---|---|---|
| 2008/0057532 | A1* | 3/2008 | Martin | A61L 15/56 435/34 |
| 2008/0187664 | A1* | 8/2008 | Banning | C09B 69/06 427/256 |
| 2017/0101533 | A1 | 4/2017 | Yagi et al. | |
| 2020/0283633 | A1* | 9/2020 | Hayakawa | C09B 67/0033 |

FOREIGN PATENT DOCUMENTS

| | | | |
|---|---|---|---|
| JP | 9-111136 | A | 4/1997 |
| JP | 10-195318 | A | 7/1998 |
| JP | 2005-533341 | A | 11/2005 |
| JP | 2008-189926 | A | 8/2008 |
| JP | 2015-178270 | A | 10/2015 |
| WO | 2004/006355 | A2 | 1/2004 |
| WO | 2008/026105 | A2 | 3/2008 |
| WO | 2016/002939 | A1 | 1/2016 |
| WO | 2019/107263 | A1 | 6/2019 |

OTHER PUBLICATIONS

Notification of Reasons for Refusal in Japanese Application No. 2018-197292 (dated Feb. 2019).

Notification of Reasons for Refusal in Japanese Application No. 2018-197292 (dated Apr. 2019).

International Search Report in International Application No. PCT/JP2018/043108 (dated Feb. 2019).

Amendment Under Article 19 in International Application No. PCT/JP2018/043108 (dated Apr. 2019).

Josef Arient et al., "Triphenylmethane dyes. I. Condensation of N-methylcumidine with Formaldehyde, Michler's Ketone, and O-Chlorobenzaldehyde," 22 Collection of Czechoslovak Chemical Communications 468-472 (1957).

* cited by examiner

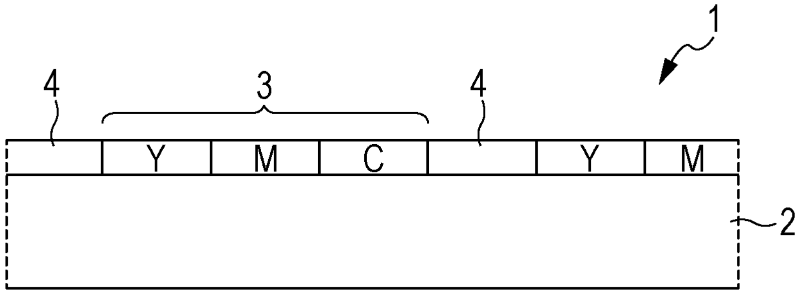
1
4
3
4
Y
M
C
Y
M
2

COLORING COMPOUND AND THERMAL TRANSFER RECORDING SHEET

CROSS-REFERENCE TO RELATED APPLICATIONS

This application is a Continuation of International Patent Application No. PCT/JP2018/043108, filed Nov. 22, 2018, which claims the benefit of Japanese Patent Application No. 2017-229293, filed Nov. 29, 2017, and Japanese Patent Application No. 2018-197292, filed Oct. 19, 2018, all of which are hereby incorporated by reference herein in their entirety.

BACKGROUND OF THE INVENTION

Field of the Invention

The present disclosure relates to a coloring compound and a thermal transfer recording sheet.

Description of the Related Art

In recent years, with prevalence of mobile color display devices, there has been an increasing demand for easy color printing of photographs captured with or documents produced with such devices. Examples of color printing modes that provide easy color printing include an electrophotographic mode, an ink jet mode, and a thermal transfer recording mode. Of these, the thermal transfer recording mode enables dry-process printing, provides reduced-size printers that are handy to carry, and hence enables easy printing irrespective of the surrounding environment, which is advantageous. In addition, since dyes are used as coloring materials, density gradation of the coloring materials provides tone of images to thereby form images having high sharpness and high color reproducibility.

The thermal transfer recording mode is an image-forming method of placing a thermal transfer recording sheet and an image-receiving sheet on top of each other, and heating the thermal transfer recording sheet to transfer the coloring material in the thermal transfer recording sheet onto the image-receiving sheet to thereby achieve recording. The thermal transfer recording sheet has, on a sheet-shaped substrate, a coloring material layer including a thermal-transfer coloring material. The image-receiving sheet has, on its surface, a coloring-material-receiving layer. The coloring material included in the coloring material layer affects the speed of transfer recording and the image quality and storage stability of recorded products, and hence is a very important material. The coloring material employed is required to have high light resistance and high dispersibility (during production of ink sheets). Thus, there has been a demand for a coloring material having, in addition to high chroma, high light resistance and high dispersibility. For example, as cyan dyes, anthraquinone-based compounds are known (Japanese Patent Application Laid-Open No. H10-195318). However, the anthraquinone-based compounds have a problem of low chroma. Triphenylmethane-based compounds are generally known to provide vivid colors, and use of the compounds in thermofusible inks (also referred to as phase-change inks or hot-melt inks) has been proposed (Japanese Patent Application Laid-Open No. 2008-189926). However, application of the triphenylmethane-based compounds to thermal transfer recording sheets has not been described.

An object of the present disclosure is to provide a coloring compound that has high chroma, high light resistance, and high dispersibility.

Another object of the present disclosure is to provide a thermal transfer recording sheet that enables formation of an image having high chroma and high light resistance.

SUMMARY OF THE INVENTION

The present disclosure relates to a coloring compound including a structure represented by Formula (1-1) or (1-2) below.

Formula (1-1)

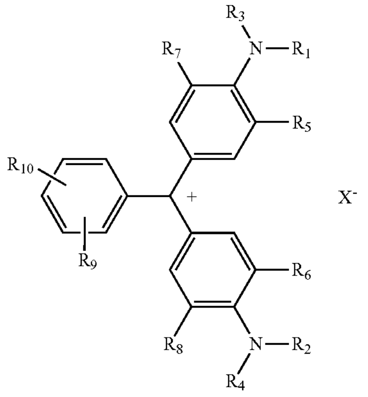

In Formula (1-1), $R_1$ and $R_2$ each independently represent an alkyl group having a substituent or an unsubstituted alkyl group, $R_3$ and $R_4$ each independently represent a hydrogen atom, an alkyl group having a substituent, an unsubstituted alkyl group, an aryl group having a substituent, or an unsubstituted aryl group, $R_5$ and $R_6$ each independently represent a hydrogen atom or an unsubstituted alkyl group having 1 to 4 carbon atoms, $R_7$ and $R_8$ each independently represent an unsubstituted alkyl group having 1 to 4 carbon atoms, $R_9$ represents a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group, $R_{10}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group, and $X^-$ represents an anion.

Formula (1-2)

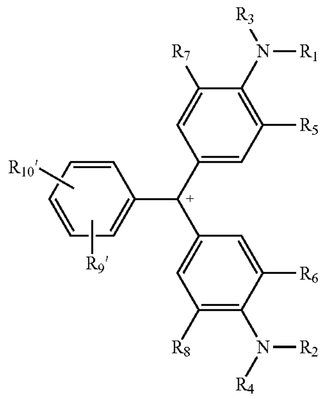

In Formula (1-2), $R_1$ to $R_8$ are the same as $R_1$ to $R_8$ in Formula (1-1), $R_{9'}$ represents a sulfonato group, and $R_{10'}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group.

The present disclosure also relates to a thermal transfer recording sheet including a substrate and a coloring material layer on the substrate, wherein the coloring material layer at least includes a yellow dye layer including a yellow dye, a magenta dye layer including a magenta dye, and a cyan dye layer including a cyan dye, and the cyan dye is the coloring compound including a structure represented by Formula (1-1) or Formula (1-2) above.

Further features of the present invention will become apparent from the following description of exemplary embodiments with reference to the attached drawing.

BRIEF DESCRIPTION OF THE DRAWINGS

FIGURE is a schematic sectional view of a thermal transfer recording sheet used in Example 1.

DESCRIPTION OF THE EMBODIMENTS

Hereinafter, the present disclosure will be described further in detail.

Coloring Compound

The compound represented by Formula (1-1) or (1-2) below has been found to have high chroma, high light resistance, and high dispersibility, which has resulted in the present disclosure.

Formula (1-1)

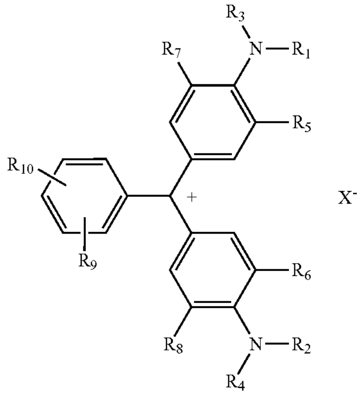

In Formula (1-1), $R_1$ and $R_2$ each independently represent an alkyl group having a substituent or an unsubstituted alkyl group, $R_3$ and $R_4$ each independently represent a hydrogen atom, an alkyl group having a substituent, an unsubstituted alkyl group, an aryl group having a substituent, or an unsubstituted aryl group, $R_5$ and $R_6$ each independently represent a hydrogen atom or an unsubstituted alkyl group having 1 to 4 carbon atoms, $R_7$ and $R_8$ each independently represent an unsubstituted alkyl group having 1 to 4 carbon atoms, $R_9$ represents a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group, $R_{10}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group, and $X^-$ represents an anion.

Formula (1-2)

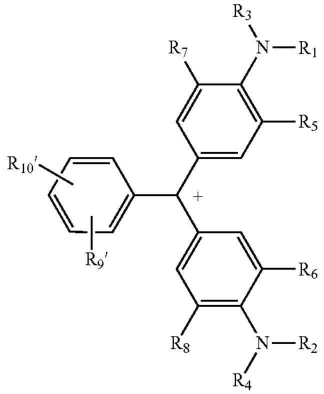

In Formula (1-2), $R_1$ to $R_8$ are the same as $R_1$ to $R_8$ in Formula (1-1), $R_{9'}$ represents a sulfonato group, and $R_{10'}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group.

The compound according to the present disclosure at least has the substituents $R_7$ and $R_8$ and the substituents $R_1$ and $R_2$ bonded to nitrogen atoms. These substituents cause formation of a steric twist structure in the molecule. Thus, the intramolecular or intermolecular interaction is suppressed by the steric twist, to thereby suppress aggregation of the compound. As a result, a highly dispersed state is maintained, which provides high chroma. On the other hand, the steric twist structure covers and protects the central carbon atom susceptible to attack, which inferentially results in high light resistance. Incidentally, when $R_1$ to $R_4$ are all hydrogen atoms, the compound tends to be affected by light and has lower light resistance.

In Formula (1-1) and Formula (1-2), in $R_1$, $R_2$, $R_3$, and $R_4$, the unsubstituted alkyl group is not particularly limited, but may be, for example, a linear, branched, or cyclic alkyl group having 1 to 20 carbon atoms. Specific examples include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

In particular, preferred are an ethyl group, an n-butyl group, a sec-butyl group, a dodecyl group, a cyclohexyl group, a methylcyclohexyl group, a 2-ethylpropyl group, a 2-ethylhexyl group, and an octyl group. More preferred are an n-butyl group, a 2-ethylhexyl group, and an octyl group. Preferably, $R_1$ and $R_2$ are identical alkyl groups and $R_3$ and $R_4$ are hydrogen atoms or identical alkyl groups because high chroma, high dispersibility, and high light resistance are provided.

In Formula (1-1) and Formula (1-2), in $R_1$, $R_2$, $R_3$, and $R_4$, the substituent of the alkyl group having a substituent is not particularly limited, but may be, for example, a phenyl group, a cyano group, a halogen atom (such as a fluorine atom or a chlorine atom), a nitro group, a salt of a sulfonic group (such as sodium sulfonate), a sulfo group (—$SO_3H$), a sulfonic acid ester group (such as a methyl sulfonate group), a perfluoroalkyl group (such as a perfluoromethyl group or a perfluoroethyl group), an alkoxy group (such as a methoxy group or an ethoxy group), or a trifluoromethylsulfonyl group. In particular, the substituent is preferably a phenyl group or a cyano group because a compound having high chroma, high light resistance, and high dispersibility is provided.

In Formula (1-1) and Formula (1-2), in $R_3$ and $R_4$, the unsubstituted aryl group is not particularly limited, but may be a phenyl group or a naphthyl group.

In Formula (1-1) and Formula (1-2), in $R_3$ and $R_4$, the substituent of the aryl group having a substituent is not particularly limited, but may be, for example, an alkyl group such as a methyl group or an ethyl group, an alkoxy group such as a methoxy group or an ethoxy group, a cyano group, a salt of a sulfonic acid group such as sodium sulfonate, or a sulfonic acid group.

In Formula (1-1) and Formula (1-2), in $R_5$, $R_6$, $R_7$, and $R_8$, the alkyl group having 1 to 4 carbon atoms is not particularly limited, but may be, for example, a methyl group, an ethyl group, an n-propyl group, an iso-propyl group, or an n-butyl group.

In particular, preferably, $R_5$, $R_6$, $R_7$, and $R_8$ each independently represent a methyl group or an ethyl group, more preferably a methyl group because high chroma, high dispersibility, and high light resistance are provided.

In Formula (1-1), in $R_9$ and $R_{10}$, the halogen atom is not particularly limited, but may be a fluorine atom, a chlorine atom, a bromine atom, or an iodine atom. Of these, preferred are a fluorine atom and a chlorine atom because high chroma, high dispersibility, and high light resistance are provided.

In Formula (1-1), examples of $R_9$ and $R_{10}$ include a sulfo group; sulfonic acid ester groups such as a methyl sulfonate group and an ethyl sulfonate group; sulfonamide groups such as a sulfonamide group, an N-methylsulfonamide group, an N,N-dimethylsulfonamide group, an N-ethylsulfonamide group, an N,N-diethylsulfonamide group, an N-propylsulfonamide group, an N,N-dipropylsulfonamide group, an N-butylsulfonamide group, an N,N-dibutylsulfonamide group, an N-pentylsulfonamide group, an N,N-dipentylsulfonamide group, an N-hexylsulfonamide group, an N,N-dihexylsulfonamide group, an N-octylsulfonamide group, an N,N-dioctylsulfonamide group, an N-(2-ethylhexyl)sulfonamide group, an N,N-bis(2-ethylhexyl)sulfonamide group, an N-(1-methylhexyl)sulfonamide group, an N-(1-methylheptyl)sulfonamide group, an N-methyl-N-butylsulfonamide group, an N-methyl-N-pentylsulfonamide group, an N-methyl-N-hexylsulfonamide group, an N-methyl-N-octylsulfonamide group, an N-phenylsulfonamide group, an N-(p-methylphenyl)sulfonamide group, an N-pyrrolidylsulfonyl group, and an N-piperidylsulfonyl group; sulfonic acid salt groups such as lithium sulfonate, sodium sulfonate, and potassium sulfonate; benzenesulfonyl groups that may have a substituent such as a benzenesulfonyl group, a toluenesulfonyl group, and a nitrobenzenesulfonyl group; and a trifluoromethylsulfonyl group. Of these, preferred are a sulfo group and sodium sulfonate because high chroma, high dispersibility, and high light resistance are provided.

In Formula (1-1), in $R_9$ and $R_{10}$, the perfluoroalkyl group is not particularly limited, but may be, for example, a perfluoromethyl group, a perfluoroethyl group, a perfluoroisopropyl group, a perfluoro-n-butyl group, or a perfluorooctyl group. Of these, preferred is a perfluoromethyl group because high chroma, high dispersibility, and high light resistance are provided.

In Formula (1-1), a moiety A constituted by $R_9$, $R_{10}$, and a benzene ring to which $R_9$ and $R_{10}$ bond preferably has a structure represented by any one of Formulas (4) to (6) below because high chroma, high dispersibility, and high light resistance are provided.

Formula (4)

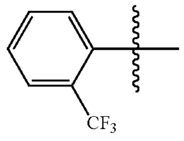

Formula (5)

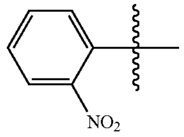

Formula (6)

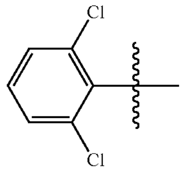

In Formula (1-1), the anion of $X^-$ is not particularly limited, but may be, for example, a fluoride ion, a chloride ion, a bromide ion, an iodide ion, a cyanide ion, a nitrate ion, a benzenesulfonate ion, a p-toluenesulfonate ion, a methylsulfate ion, an ethylsulfate ion, a propylsulfate ion, a tetrafluoroborate ion, a tetraphenylborate ion, a benzenesulfinate ion, an acetate ion, a trifluoroacetate ion, a propionylacetate ion, a benzoate ion, an oxalate ion, a succinate ion, a malonate ion, an oleate ion, a stearate ion, an ascorbate ion, a picolinate ion, a monohydrogendiphosphate ion, a dihydrogendiphosphate ion, a pentafluoropropionate ion, a chlorosulfonate ion, a fluorosulfonate ion, a perchlorate anion, a trifluoromethanesulfonyl anion, a bis(trifluoromethanesulfonyl)imide anion, a naphthalenesulfonyl ion, a naphthalenedisulfonate ion, a tristrifluoromethanesulfonyl methide anion, a tetraaryl borate anion, or a sulfate anion.

In Formula (1-2), $R_{9'}$ is a sulfonato group ($-SO_3^-$).

In Formula (1-2), $R_{10'}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group.

In Formula (1-2), a moiety B constituted by $R_{9'}$, $R_{10'}$, and a benzene ring to which $R_{9'}$ and $R_{10'}$ bond preferably has a structure represented by Formula (7) below because high chroma, high dispersibility, and high light resistance are provided.

Formula (7)

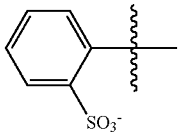

Preferred examples of the compound represented by Formula (1-1) or Formula (1-2) are the following Compounds (A1) to (A37), but are not limited to the following compounds.

(A1)

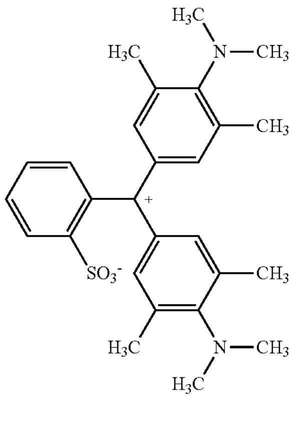

-continued (A2)

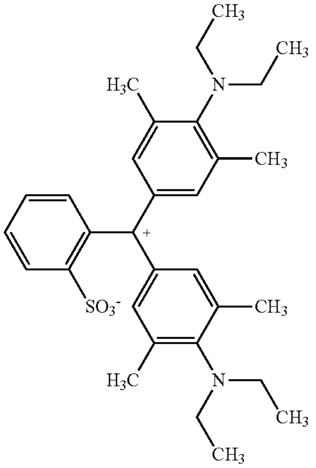

(A3)

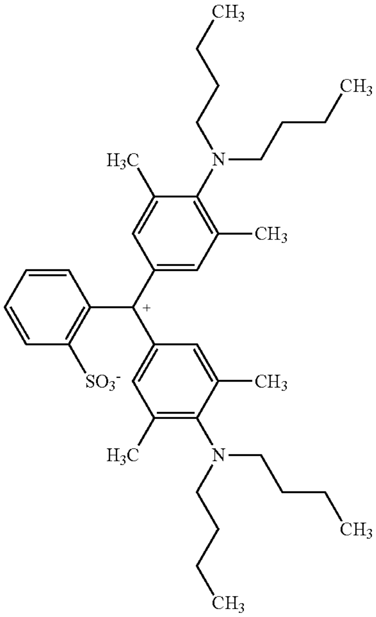

-continued
(A4)
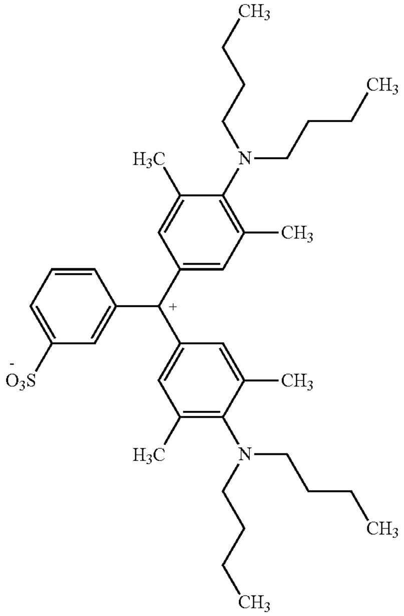
(A5)
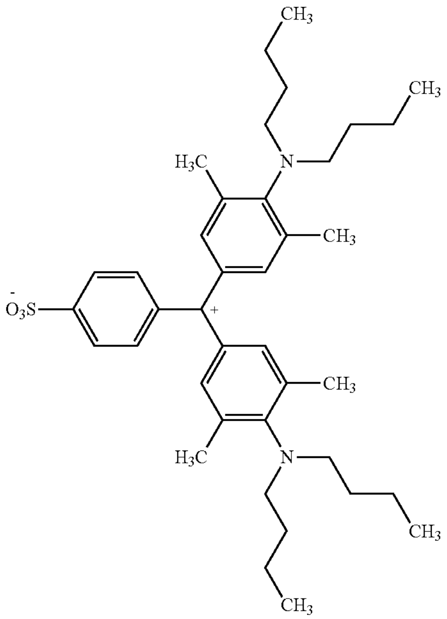
-continued
(A6)
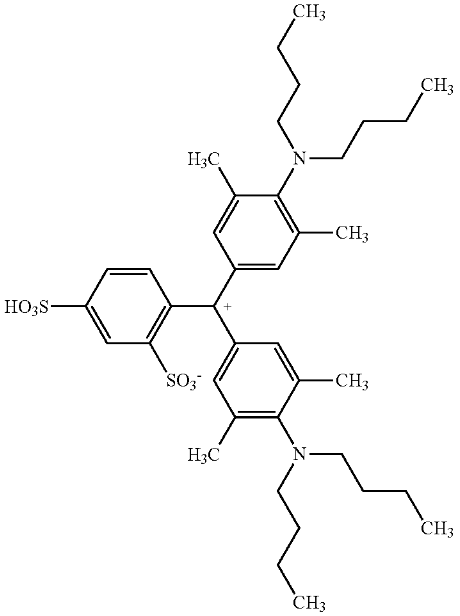
(A7)
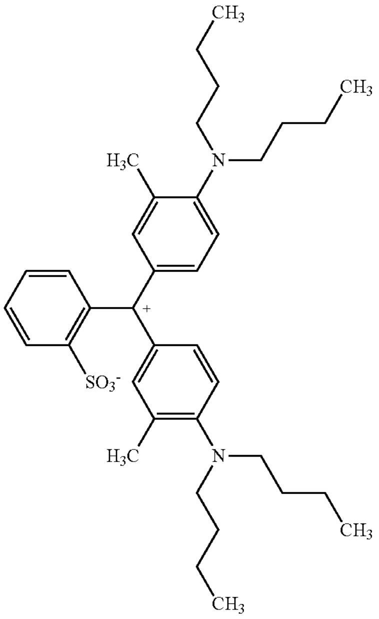

-continued
(A8)
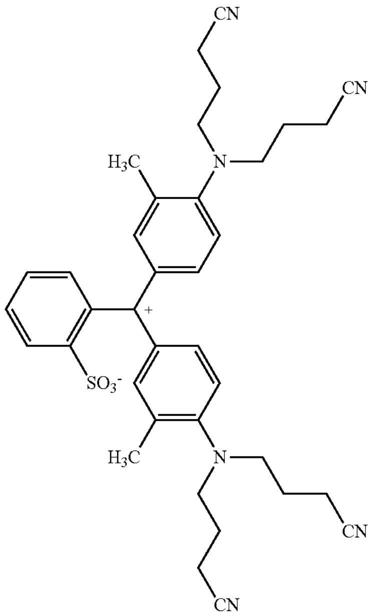
(A9)
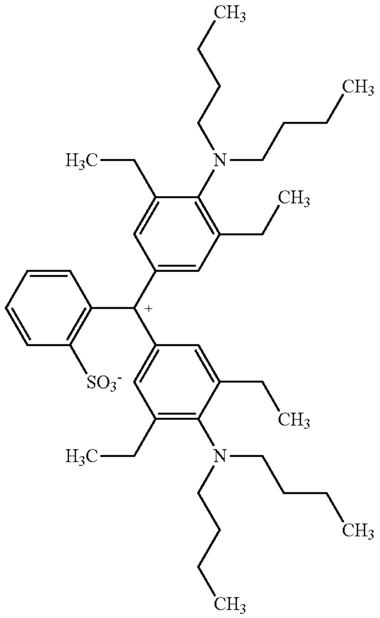
-continued
(A10)
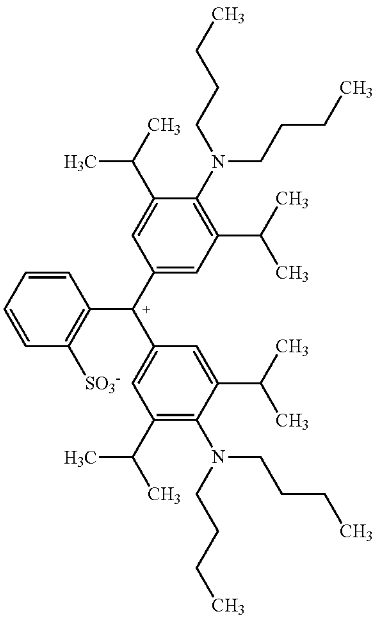
(A11)
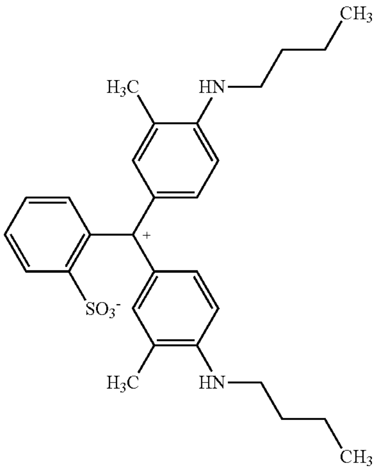
(A12)
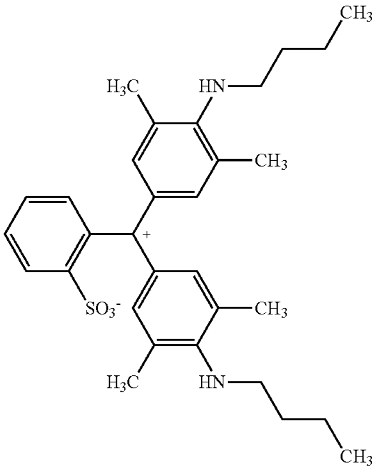

-continued
(A13)
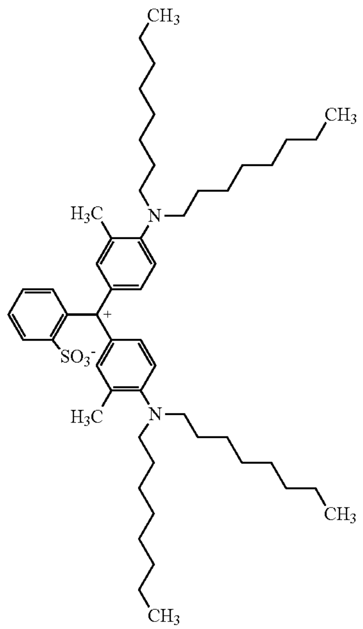
(A14)
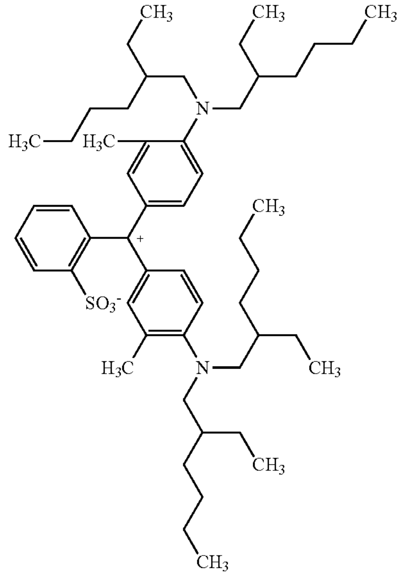
-continued
(A15)
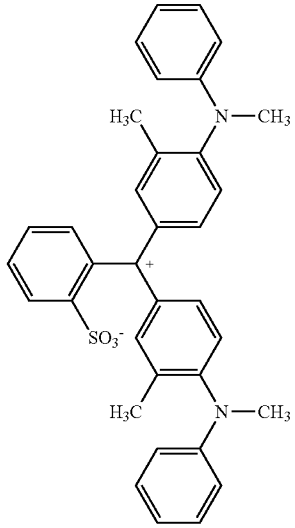
(A16)
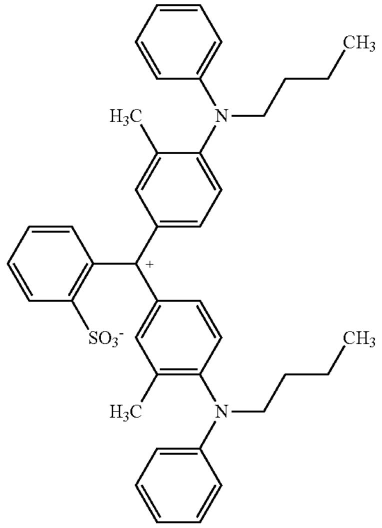
(A17)
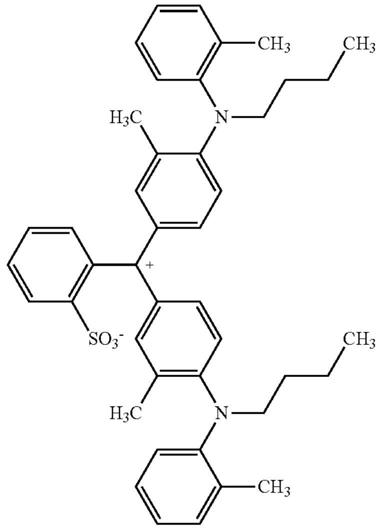

-continued
(A18)
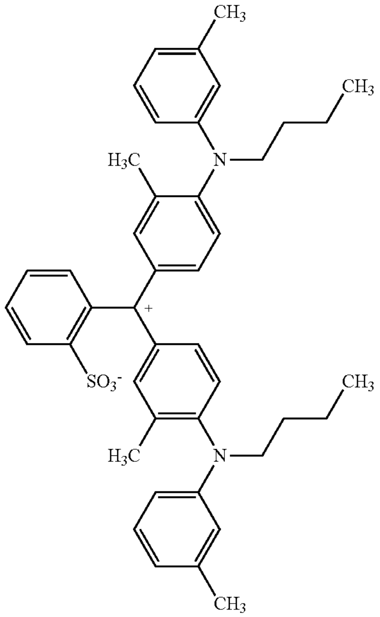
(A19)
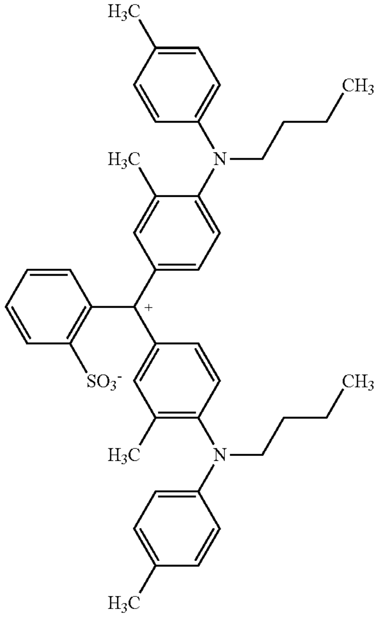
-continued
(A20)
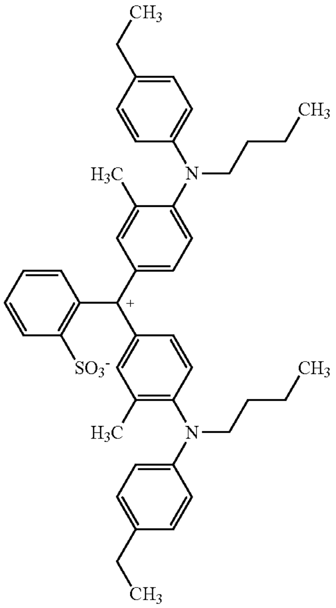
(A21)
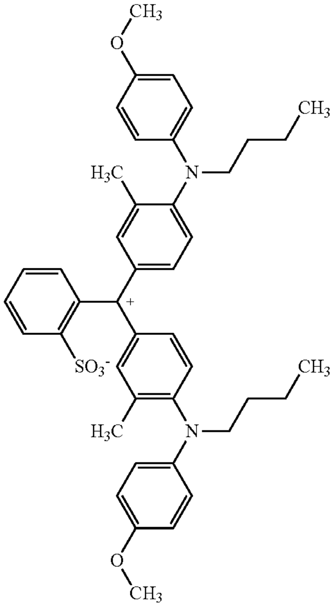

-continued
(A22)
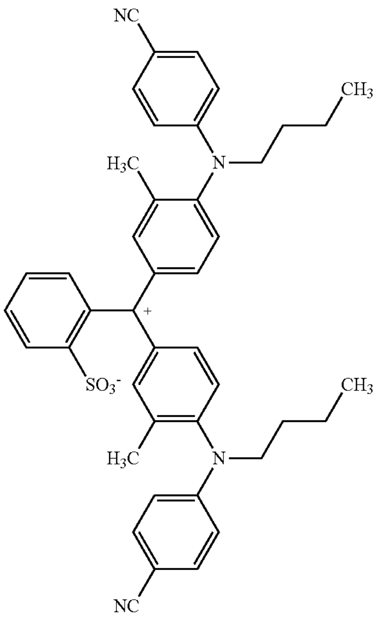
(A23)
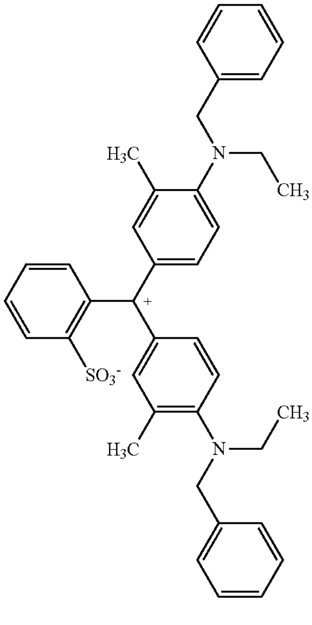
-continued
(A24)
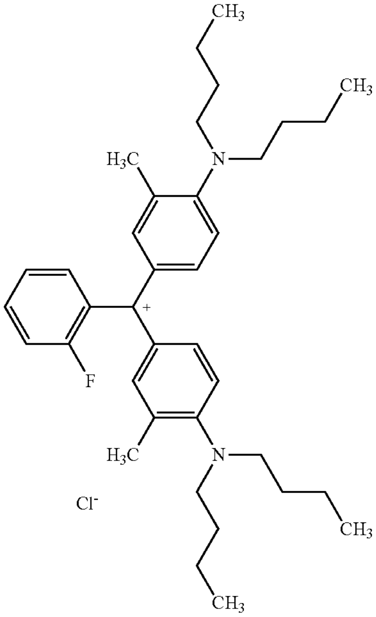
(A25)
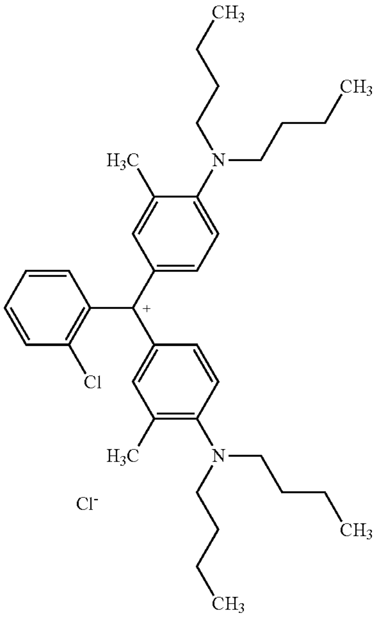

-continued
(A26)
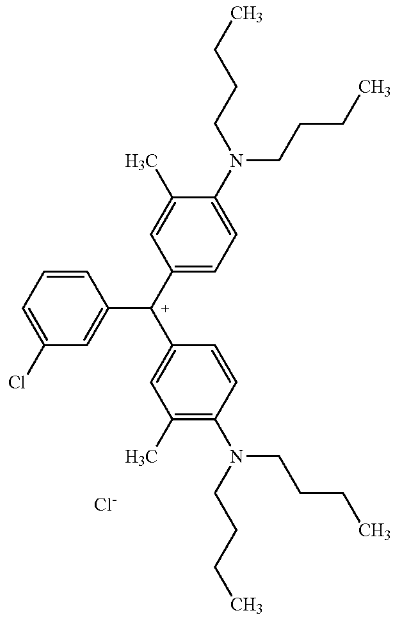
(A27)
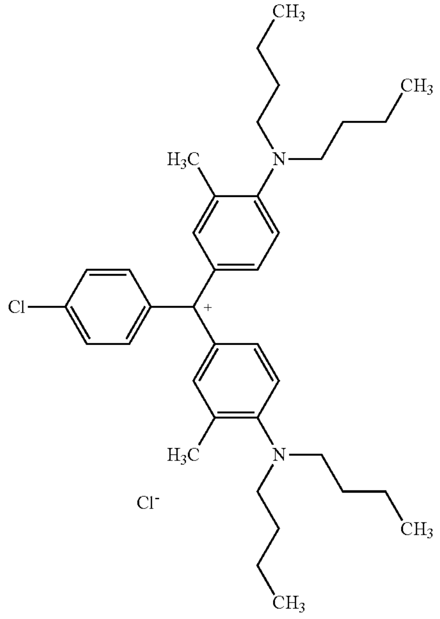
-continued
(A28)
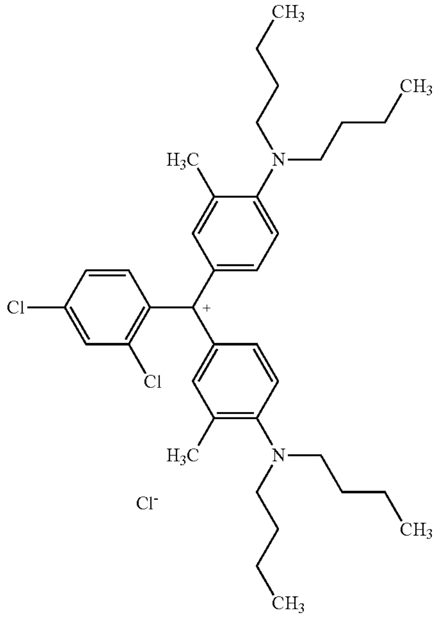
(A29)
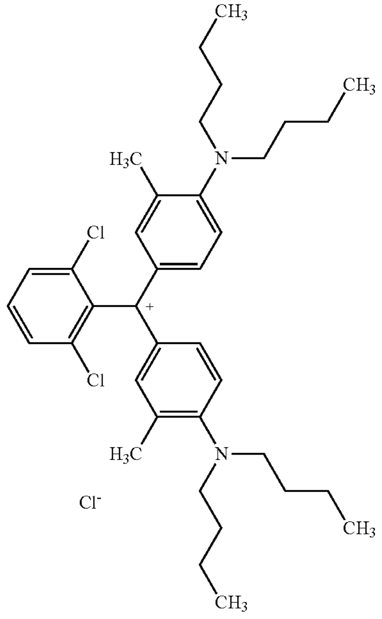

(A30)
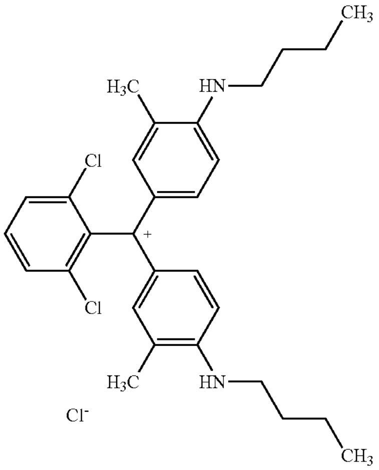
(A31)
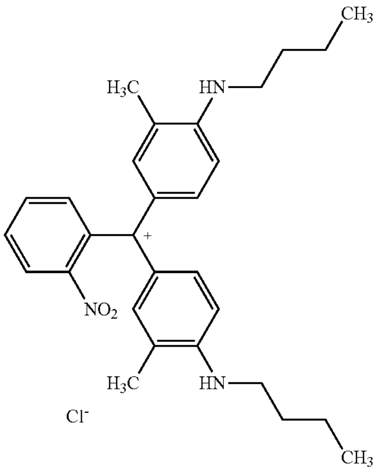
(A32)
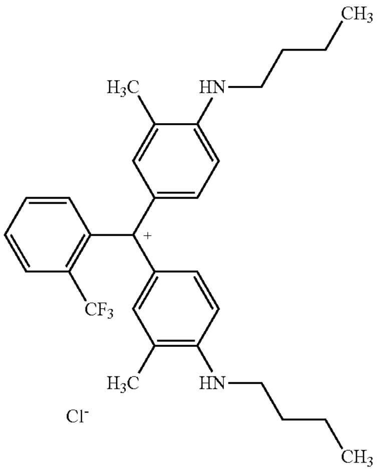
(A33)
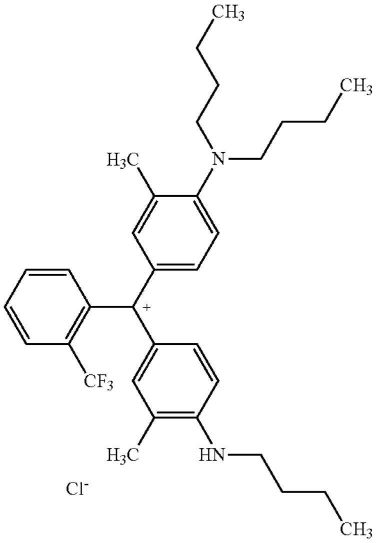
(A34)
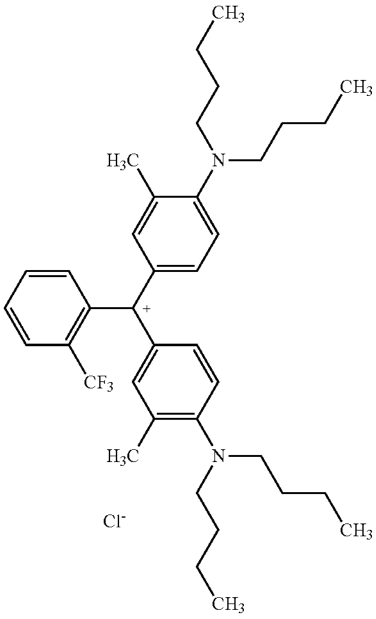

-continued (A35)

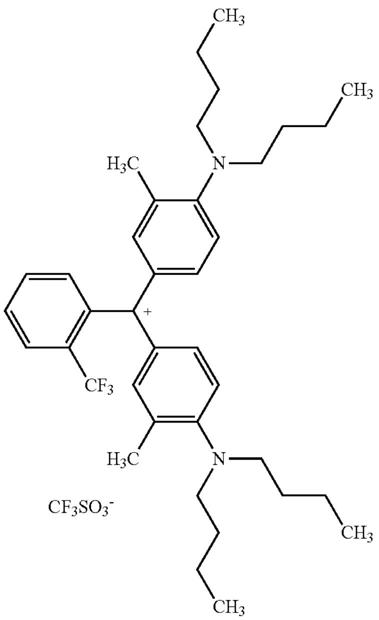

(A36)

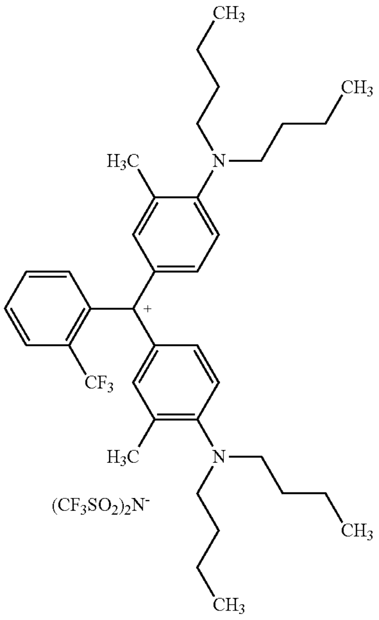

-continued (A37)

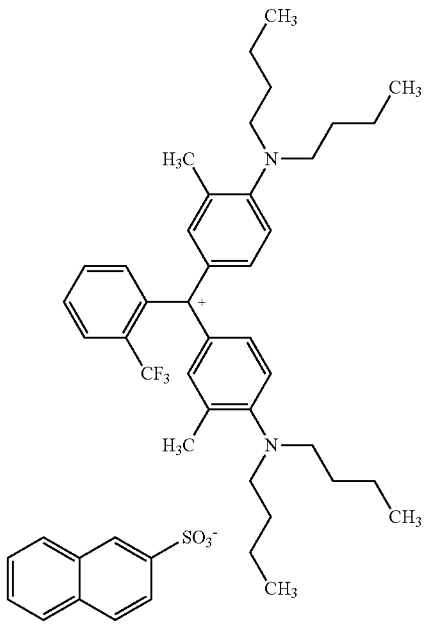

Of these, preferred compounds as cyan dyes are Compounds (A2), (A3), (A5), (A7), (A11), (A12), (A13), (A14), (A15), (A16), (A17), (A18), (A19), (A20), (A23), (A25), (A29), (A30), (A31), (A32), (A33), (A34), (A35), (A36), and (A37). More preferred are (A3), (A7), (A11), (A15), (A23), (A25), (A29), (A30), and (A34) because high chroma, high dispersibility, and high light resistance are provided.

In the compound represented by Formula (1-1) or Formula (1-2), the cation may be delocalized, and the cation moiety may be present in any position in the molecule; such structures all fall within the scope of the present disclosure. For example, in the case of Compound (A7) having an anionic substituent in the molecule, the structure changes as follows.

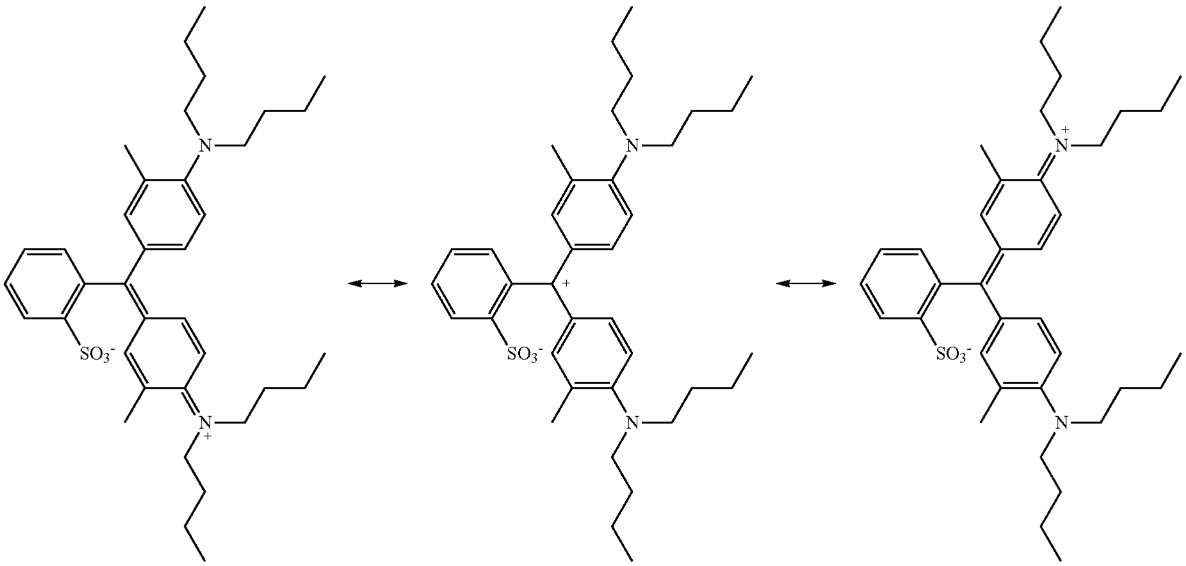
(A7)
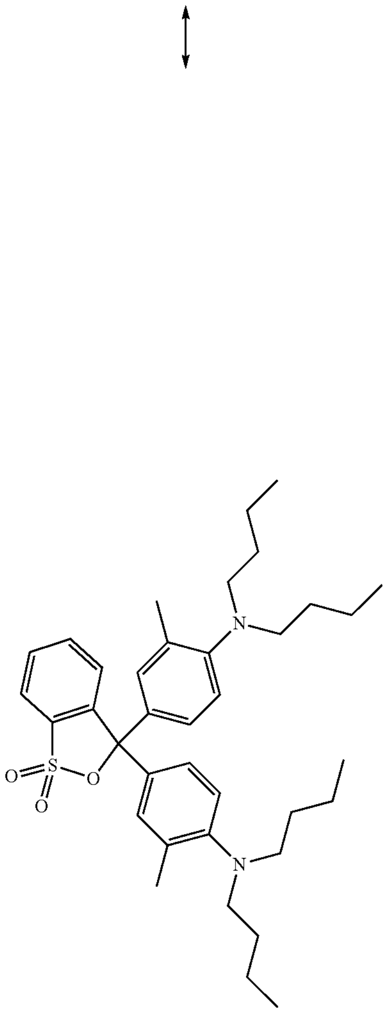
In the case of Compound (A25) not having an anionic substituent in the molecule, the structure changes as follows.

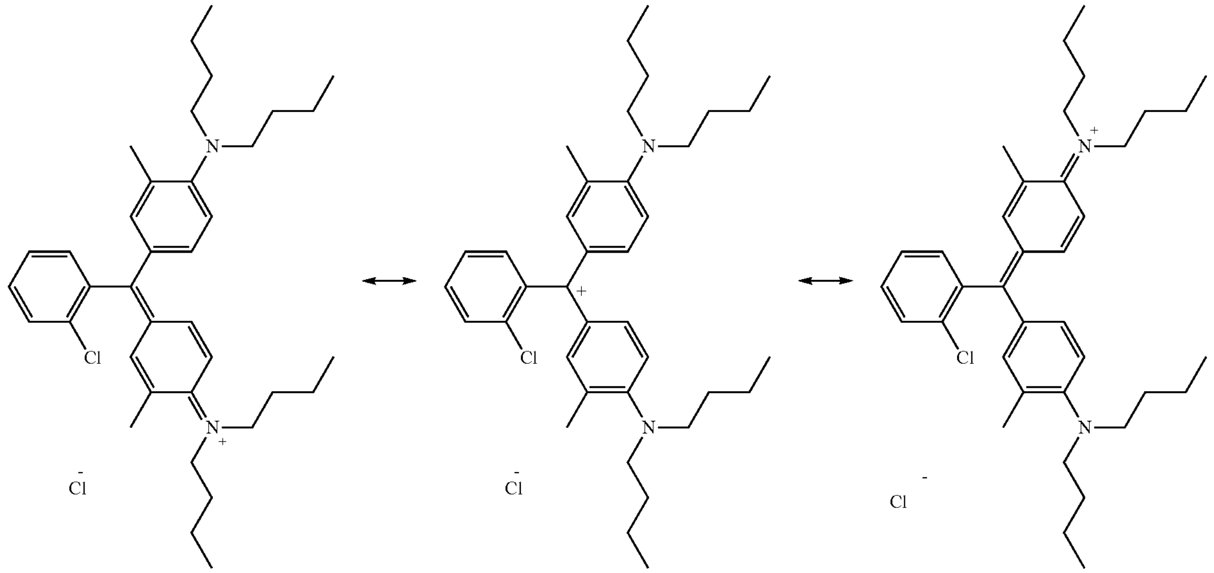

(A25)

The compound represented by General formula (1-1) or Formula (1-2) can be synthesized by a publicly known method. Specifically, the compound represented by General formula (1-1) or Formula (1-2) can be synthesized by a condensation step of condensing Compounds (A), (B), and (C) to obtain Compound (D), and a subsequent oxidation step of oxidizing Compound (D). The condensation step and the oxidation step can be performed in the presence of, for example, a liquid solvent, a condensing agent, or an oxidizing agent as needed.

An example of the synthesis scheme will be described below; however, the synthesis scheme is not limited to this synthesis method. In the synthesis scheme, $R_1$ to $R_{10}$, $R_{9'}$, and $R_{10'}$ in Compounds (A) to (D) are the same as $R_1$ to $R_{10}$ in General formula (1-1). The compound represented by General formula (1-1) or Formula (1-2) can be synthesized as a mixture of a plurality of isomers that are different in the species, number, or positions of substituents; however, for simplicity, the compound in the present disclosure is described as "compound" even when it is a mixture. Compounds used in the synthesis scheme are described as those in free-acid forms; alternatively, compounds in salt forms may be used.

In the case of synthesizing a compound in which, in General formula (1-1), $R_1$ and $R_2$ are identical substituents, $R_3$ and $R_4$ are identical substituents, $R_5$ and $R_6$ are identical substituents, and $R_7$ and $R_8$ are identical substituents, Compounds (A) and (B) employed may be an identical compound.

[Synthesis Scheme 1]

[Synthesis scheme 1]

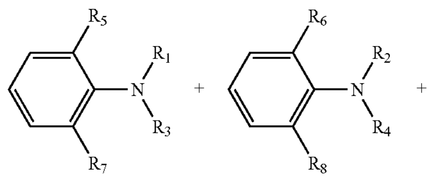

(A) (B)

-continued

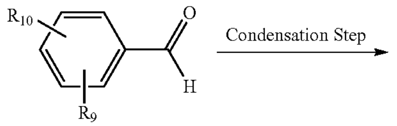

(C)

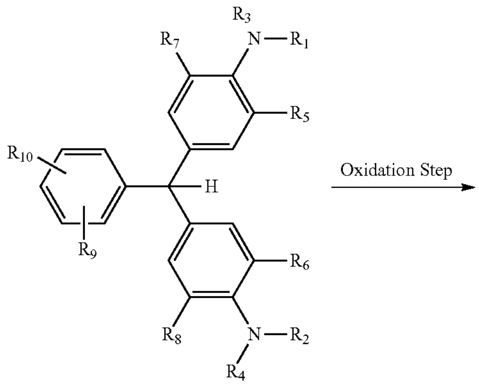

(D)

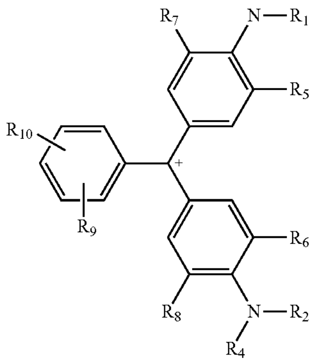

(Condensation Step)

The condensation step will be first described. The condensation step can be performed in the presence of, for example, a solvent, a condensing agent, or an oxidizing agent, as needed.

The condensation step may be performed without solvent, but is preferably performed with a solvent.

The solvent usable in the condensation step is not particularly limited. For example, water, methanol, ethanol, n-propanol, isopropanol, n-butanol, tert-butanol, ethylene glycol, glycerol, tetrahydrofuran, N,N-dimethylformamide, N,N-dimethylacetamide, N-methyl-2-pyrrolidone, 1,3-dimethyl-2-imidazolidinone, dimethyl sulfoxide, sulfolane, N,N'-dimethylpropyleneurea, chlorobenzene, 1,2-dichlorobenzene, nitrobenzene, and ethyl acetate may be used alone or as a mixture in a desired mixing ratio.

In particular, preferred examples include water, methanol, ethanol, and N,N-dimethylformamide. The amount of the reaction solvent used relative to Aldehyde compound (C) is preferably 0.1 to 1000 mass %, more preferably 1.0 to 150 mass %.

The condensing agent usable in the condensation step is not particularly limited, but may be, for example, sulfuric acid, hydrochloric acid, phosphoric acid, acetic acid, formic acid, aluminum chloride, zinc chloride, or p-toluenesulfonic acid. In particular, preferred are sulfuric acid, hydrochloric acid, and acetic acid. The amount of the condensing agent used relative to Aldehyde compound (C) is preferably 0.01 to 20 mass %, more preferably 0.1 to 10 mass %.

The reaction temperature in the condensation step may be in the range of 0 to 160° C., in particular, preferably 50° C. to 140° C., more preferably 60° C. to 120° C. This condensation reaction is ordinarily complete within 24 hours. After the completion of the reaction, purification by column purification or crystallization may be performed.

(Oxidation Step)

Hereinafter, the oxidation step will be described. The oxidation step may be performed in the presence of, for example, a solvent or an oxidizing agent, as needed.

The oxidation step may be performed without solvent, but is preferably performed with a solvent.

The solvent usable in the oxidation step is not particularly limited. For example, water, methanol, ethanol, n-propanol, isopropanol, n-butanol, tert-butanol, ethylene glycol, glycerol, tetrahydrofuran, N,N-dimethylformamide, N,N-dimethylacetamide, N-methyl-2-pyrrolidone, 1,3-dimethyl-2-imidazolidinone, dimethyl sulfoxide, sulfolane, N,N'-dimethylpropyleneurea, chlorobenzene, 1,2-dichlorobenzene, nitrobenzene, ethyl acetate, and chloroform may be used alone or as a mixture in a desired mixing ratio.

In particular, preferred examples include 1,2-dichlorobenzene, ethyl acetate, and chloroform. The amount of the reaction solvent used relative to Aldehyde compound (C) is preferably 0.1 to 1000 mass %, more preferably 1.0 to 200 mass %.

The oxidizing agent usable in the oxidation step is not particularly limited, but may be, for example, zinc oxide, iron oxide, manganese oxide, hydrogen peroxide, chloranil, or oxygen.

Preferred are manganese oxide and chloranil. The amount of the oxidizing agent used relative to Aldehyde compound (C) is preferably 0.01 to 20 mass %, more preferably 0.1 to 5 mass %.

The solvent in the oxidation step preferably has a pH of 1 to 9, more preferably a pH of 2 to 8, particularly preferably a pH of 3 to 7.

The reaction temperature in the oxidation step may be in the range of 0 to 150° C., preferably 10° C. to 100° C., particularly preferably 20° C. to 80° C. This oxidation reaction is ordinarily complete within 18 hours. After the completion of the reaction, purification by column purification or crystallization may be performed.

The compounds represented by General formula (1-1) and Formula (1-2) above may be used alone or in combination of two or more thereof depending on the application for the purpose of adjusting the tone, for example. Such a compound may be used in combination with a publicly known dye or two or more publicly known dyes.

Examples of such a dye used in combination are not particularly limited, but include compounds selected from the group consisting of compounds represented by Formulas (2) and (3) below.

Formula (2)

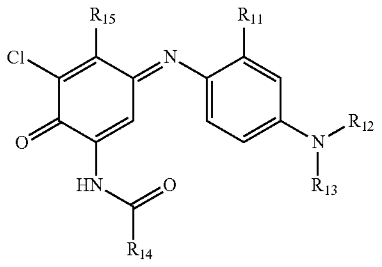

In Formula (2), $R_{11}$ to $R_{15}$ each independently represent an alkyl group, an aryl group having a substituent, or an unsubstituted aryl group.

In Formula (2), in $R_{11}$ to $R_{15}$, the alkyl group may be a group among the above-described examples of the alkyl group in $R_1$, $R_2$, $R_3$, and $R_4$ in Formula (1-1). In particular, an alkyl group having 1 to 2 carbon atoms such as a methyl group or an ethyl group is preferred because high chroma, high dispersibility, and high light resistance are provided.

In Formula (2), in $R_{11}$ to $R_{15}$, the aryl group having a substituent or the unsubstituted aryl group is not particularly limited, but may be a group among the above-described examples of the aryl group having a substituent or the unsubstituted aryl group in $R_3$ and $R_4$ in Formula (1-1).

Preferred examples of the compound represented by Formula (2) are the following Compounds (B1) to (B6). However, the compound is not limited to the following compounds.

(B1)

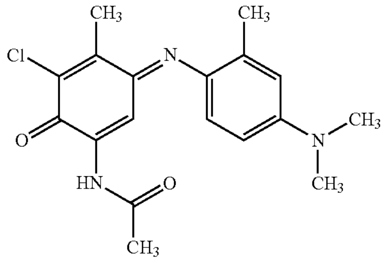

-continued (B2)

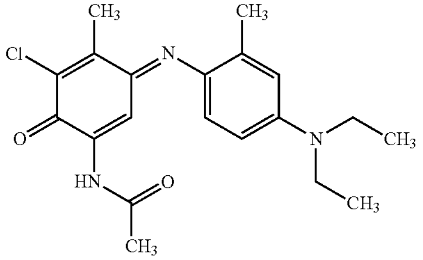

(B3)

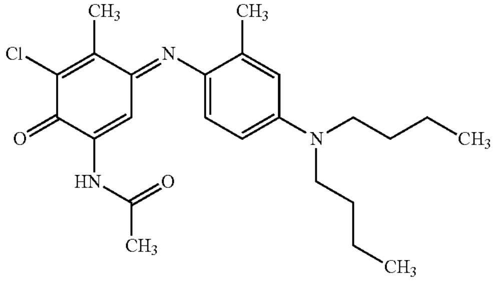

(B4)

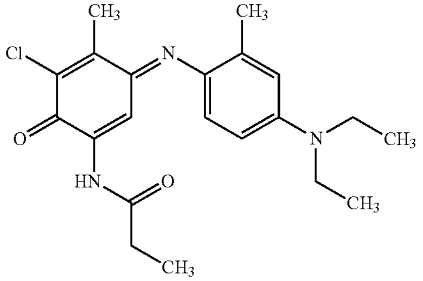

(B5)

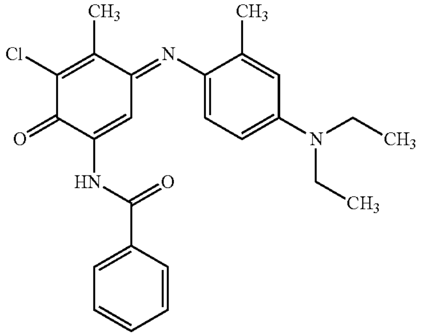

(B6)

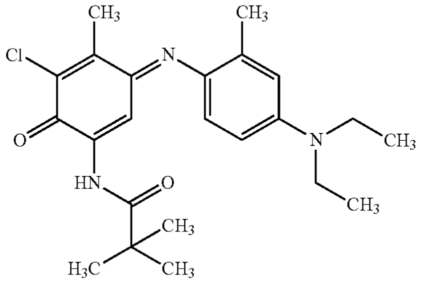

Of these, preferred are Compounds (B1), (B2), and (B3). From the viewpoint of advantages of the present disclosure, more preferred is Compound (B2).

Hereinafter, a cyan dye represented by Formula (3) will be described.

Formula (3)

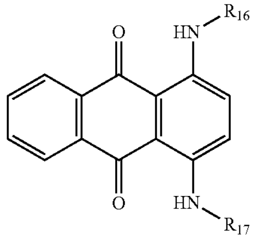

In Formula (3), $R_{16}$ and $R_{17}$ each independently represent an alkyl group, an aryl group having a substituent, or an unsubstituted aryl group.

In Formula (3), in $R_{16}$ and $R_{17}$, the alkyl group may be a group among the above-described examples of the alkyl group in $R_1$, $R_2$, $R_3$, and $R_4$ in Formula (1-1). In particular, an alkyl group having 1 to 2 carbon atoms such as a methyl group or an ethyl group is preferably used because high chroma, high dispersibility, and high light resistance are provided.

In Formula (3), in $R_{16}$ and $R_{17}$, the aryl group having a substituent or the unsubstituted aryl group is not particularly limited, but may be, for example, a phenyl group or a naphthyl group. In particular, a phenyl group is preferably used because high chroma, high dispersibility, and high light resistance are provided. Examples of the substituent of the substituted aryl group include alkyl groups and alkoxy groups.

Preferred examples of the compound represented by Formula (3) are the following Compounds (C1) to (C6). However, the compound is not limited to the following compounds.

(C1)

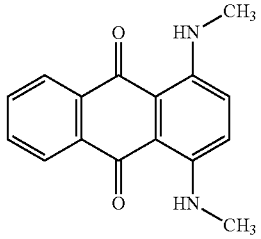

(C2)

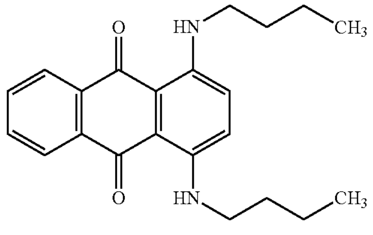

(C3)

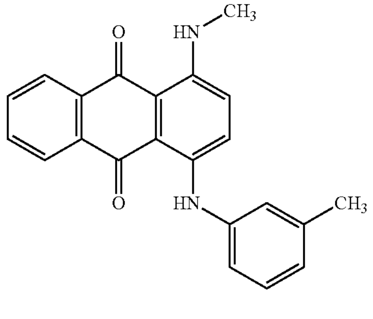

-continued (C4)

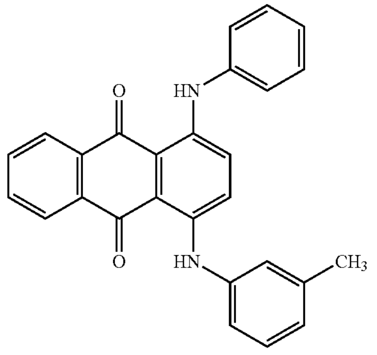

(C5)

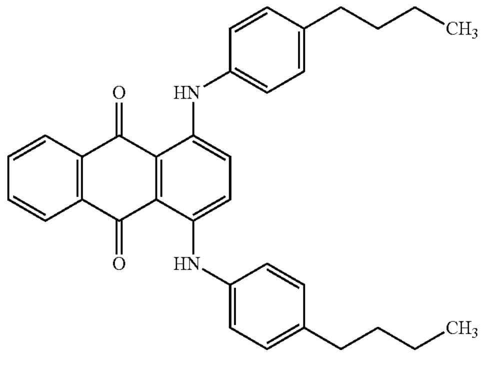

(C6)

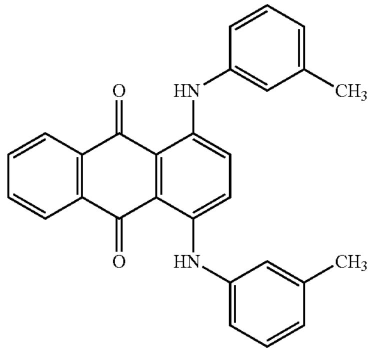

Of these, preferred as cyan dyes are Compounds (C3), (C4), and (C5). From the viewpoint of advantages of the present disclosure, more preferred is Compound (C3).

<Thermal Transfer Recording Sheet>

The thermal transfer recording sheet according to the present disclosure includes a substrate and a coloring material layer on the substrate. The coloring material layer at least includes a yellow dye layer including a yellow dye, a magenta dye layer including a magenta dye, and a cyan dye layer including a cyan dye.

Formation of an image using the thermal transfer recording sheet is performed in the following manner.

The thermal transfer recording sheet and an image-receiving sheet having, on its surface, a coloring-material-receiving layer are placed on top of each other such that the coloring material layer and the coloring-material-receiving layer face each other; and the thermal transfer recording sheet is heated by heating methods such as using a thermal head. In this way, the coloring material in the thermal transfer recording sheet is sublimed to thereby be transferred onto the image-receiving sheet.

Hereinafter, the configuration of the thermal transfer recording sheet according to the present disclosure will be described.

<Substrate>

The substrate constituting the thermal transfer recording sheet according to the present disclosure supports a coloring material layer described later. The substrate may be a publicly known substrate. The substrate is not particularly limited as long as it has sufficient heat resistance and strength, but may be, for example, a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, cellophane, a cellulose derivative, a polyethylene film, a polyvinyl chloride film, a nylon film, capacitor paper, or paraffin paper.

In particular, preferred is a polyethylene terephthalate film from the viewpoint of mechanical strength, solvent resistance, and costs.

The substrate has a thickness of 0.5 μm to 50 μm, preferably 3 μm to 10 μm from the viewpoint of transferability.

One or both of the surfaces of the substrate are preferably subjected to adhesion treatment as needed. When dye ink is applied in order to form, on the substrate, a coloring material layer, the coating liquid tends to have insufficient wettability and adhesion, for example. For this reason, ordinarily, the adhesion treatment is preferably performed.

The adhesion treatment is not particularly limited, but may be, for example, ozone treatment, corona discharge treatment, ultraviolet treatment, plasma treatment, low-temperature plasma treatment, primer treatment, or chemical treatment. Two or more among these treatments may be performed in combination.

In the adhesion treatment for the substrate, an adhesion layer may be formed on the substrate by coating.

The material used for the adhesion layer is not particularly limited, but examples thereof include the following: organic materials such as polyester resins, polystyrene resins, polyacrylate resins, polyamide resins, polyether resins, polyvinyl acetate resins, polyethylene resins, polypropylene resins, polyvinyl chloride resins, polyvinyl alcohol resins, and polyvinyl butyral resins; and fine particles of inorganic materials such as silica, alumina, magnesium carbonate, magnesium oxide, and titanium oxide.

<Coloring Material Layer>

The thermal transfer recording sheet includes, on the substrate, a coloring material layer. The coloring material layer at least includes a yellow dye layer, a magenta dye layer, and a cyan dye layer. The thermal transfer recording sheet may additionally include, as a dye layer, a publicly known black dye layer.

In the thermal transfer recording sheet, on the substrate, the dye layers are formed in a planar arrangement (not stacked, but are formed side by side), which is not particularly limited. For example, on the substrate sheet, a yellow dye layer, a magenta dye layer, and a cyan dye layer are repeatedly formed in the transport direction of the substrate sheet. When this thermal transfer recording sheet is used, images are sequentially formed from a yellow image, a magenta image, to a cyan image, to thereby form a single full-color image. Subsequently, these steps of forming images are repeated. In addition to the plurality of dye layers, a transferable protective layer may be added to the planar arrangement. Furthermore, a thermofusible black layer may be added.

In the present disclosure, as the cyan dye included in the cyan dye layer, a compound having a structure represented by Formula (1-1) or Formula (1-2) above is used.

This dye may be combined with a publicly known thermal-transfer dye that is not particularly limited as long as it is transferred through sublimation under heating, and that is appropriately selected in consideration of, for example, hue, printing sensitivity, light resistance, preservability, and solubility in the binder resin.

Each of the dye layers includes a dye coloring material and a binder resin. The method of forming each dye layer is not particularly limited. The dye layer is ordinarily produced in the following manner.

The specific dye, the binder resin, and optionally a surfactant and a wax are gradually added to a solvent under stirring, to thereby be sufficiently mixed with the solvent. In addition, a dispersion machine is used to apply a mechanical shear force to achieve stable dissolution or particulate dispersion of the composition, to prepare ink. Subsequently, the ink is applied to a base film serving as a substrate and dried, to thereby form a dye layer on the substrate. From the viewpoint of transferability, the ink is preferably applied in such an amount that the coloring material layer after dry would have a thickness of 0.1 μm to 5 μm.

The solvent usable for this production method is not particularly limited, but may be, for example, water or an organic solvent. Preferred examples of the organic solvent include alcohols such as methanol, ethanol, isopropanol, and isobutanol; cellosolves such as methyl cellosolve and ethyl cellosolve; aromatic hydrocarbons such as toluene, xylene, and chlorobenzene; esters such as ethyl acetate and butyl acetate; ketones such as acetone, methyl ethyl ketone, methyl isobutyl ketone, and cyclohexanone; halogenated hydrocarbons such as methylene chloride, chloroform, and trichloroethylene; ethers such as tetrahydrofuran and dioxane; N,N-dimethylformamide, and N-methylpyrrolidone. These organic solvents may be used alone or in combination of two or more thereof as needed.

The amount of each color dye used relative to 100 parts by mass of the binder resin is 50 to 300 parts by mass, preferably 80 to 280 parts by mass, more preferably 85 to 250 parts by mass from the viewpoint of transferability. This amount is, in the case of using two or more dyes as a mixture, the total parts by mass of these dye coloring materials.

Examples of the binder resin include various resins. In particular, preferred are water-soluble resins such as cellulose resins, polyacrylic resins, starch resins, and epoxy resins; and organic-solvent-soluble resins such as polyacrylate resins, polymethacrylate resins, polystyrene resins, polycarbonate resins, polyethersulfone resins, polyvinyl butyral resins, ethylcellulose resins, acetylcellulose resins, polyester resins, AS resins, and phenoxy resins. These resins may be used alone or in combination of two or more thereof as needed.

<Other Components>

The thermal transfer recording sheet may be made to include a surfactant, so that it has sufficient lubricity while being heated by the thermal head (during printing). Examples of the surfactant added include cationic surfactants, anionic surfactants, and nonionic surfactants.

Examples of the cationic surfactants are as follows: dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactants include fatty acid soaps such as sodium stearate and sodium dodecanoate, sodium dodecyl sulfate, sodium dodecylbenzene sulfate, and lauryl sodium sulfate.

Examples of the nonionic surfactants are as follows: dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

The thermal transfer recording sheet may be made to include a wax, so that it has sufficient lubricity while not being heated by the thermal head. Non-limiting examples of the wax added include polyethylene waxes, paraffin waxes, and fatty acid ester waxes.

To the thermal transfer recording sheet, in addition to the above-described additives, an ultraviolet absorbent, a preservative, an antioxidant, an antistatic agent, and a viscosity modifier may be added as needed.

In the thermal transfer recording sheet, for the purpose of improving its heat resistance or the mobility of the thermal head, a heat-resistant lubricious layer is preferably disposed on a surface of the substrate, the surface being opposite from a surface having the coloring material layer thereon. The heat-resistant lubricious layer is formed of a heat-resistant resin. The heat-resistant resin is not particularly limited, and examples thereof are as follows: polyvinyl butyral resins, polyvinyl acetal resins, polyester resins, polyether resins, polybutadiene resins, vinyl chloride-vinyl acetate copolymer resins, styrene-butadiene copolymer resins, polyurethane acrylate, polyester acrylate, polyimide resins, and polycarbonate resins.

To the heat-resistant lubricious layer, for example, a lubricant, a crosslinking agent, a release agent, or heat-resistant fine particles may be added.

Examples of the lubricant include amino-modified silicone compounds and carboxyl-modified silicone compounds. Non-limiting examples of the heat-resistant fine particles include fine particles of silica. Non-limiting examples of the binder include acrylic resins.

The heat-resistant lubricious layer is formed by applying a heat-resistant lubricious layer coating liquid prepared by adding, to a solvent, and dissolving or dispersing the above-described resin and additives. The method of applying the heat-resistant lubricious layer coating liquid is not particularly limited, but may be a method using a bar coater, a gravure coater, a reverse roll coater, a rod coater, or an air doctor coater. In particular, preferred is the method using a gravure coater. From the viewpoint of transferability, the heat-resistant lubricious layer coating liquid is preferably applied in such an amount that it would provide a thickness of 0.1 μm to 5 μm after drying of the coloring material layer.

Upon coating, drying is preferably performed under non-limiting conditions of a temperature of 50 to 120° C. for about 1 second to about 5 minutes. When drying is not sufficiently performed, scumming may occur, or the dye ink may set off during winding, and further the dye ink having set off may be transferred again onto a dye layer of a different hue during unwinding, namely, kickback may occur.

<Heating Methods>

The heating methods for heating the thermal transfer recording sheet is not particularly limited. Use of a thermal head, which is a standard process, or use of infrared radiation or a laser beam may be employed. Alternatively, the base film itself may be energized to thereby cause heating. In this case, a film that generates heat upon energization may be used to provide an energization-type dye transfer sheet.

EXAMPLES

Hereinafter, the present disclosure will be described further in detail with reference to Examples and Comparative examples. However, the present disclosure is not limited to these Examples. Incidentally, the terms "parts" used herein are based on mass unless otherwise specified. The obtained compounds were identified using a $^{1}H$ nuclear magnetic resonance ($^{1}H$-NMR) spectrometer (AVANCE-600 NMR spectrometer, manufactured by BRUKER) and a MALDI-TOF/MS apparatus (MALDI-TOF/MS ultraFleXtreme, manufactured by BRUKER).

Production Examples of Compounds Represented by Formula (1-1) or Formula (1-2)

(Production Example 1: Production of Compound (A3))

To a glacial acetic acid (20 mL) solution of N,N-dibutyl-2,6-dimethylaniline (2.32 g), 2-sulfobenzaldehyde sodium (0.98 g) was added, and heated at 100° C. for 12 hours. After the reaction was complete, the reaction solution was cooled to room temperature, diluted with water (50 mL), and subjected to extraction using chloroform (50 mL). The extracted solution was concentrated under a reduced pressure, then dissolved in ethyl acetate (20 mL), mixed with chloranil (2.33 g), and heated at 80° C. for 4 hours. After the reaction was complete, the reaction solution was filtered, and the resultant filtrate was rinsed with water three times. The resultant solution was purified by column chromatography to obtain (A3) (1.96 g).

The compound was identified by [1] $^{1}H$-NMR analysis and [2] MALDI-TOF/MS analysis. The analysis results are as follows.

[1] Results of $^{1}H$-NMR (600 MHz, DMSO-d6, room temperature: 25° C.):

δ (ppm)=7.78 (2H, m), 7.62 (1H, dd), 7.45 (1H, dd), 6.87 (12H, s), 3.78 (8H, m), 2.12 (12H, s), 1.49 (8H, m), 1.31 (8H, m), 0.90 (12H, m)

[2] Results of MALDI-TOF/MS analysis:

$m/z=633.20\ (M+H)^{+}$

Production Examples 2 to 12: Production of Other Compounds

The same method as in Production example 1 was performed to produce and identify compounds described in Table 1.

Comparative Compounds

As Comparative compounds, the following compounds were used.

Comparative compound (1)

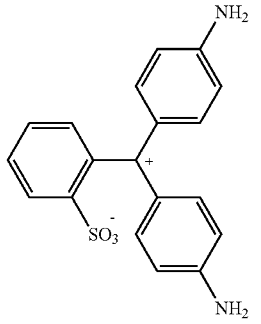

Comparative compound (2)

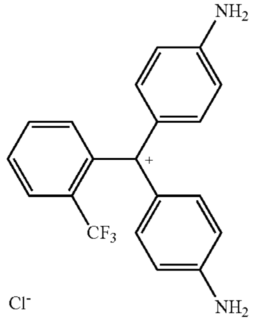

Comparative compound (3)

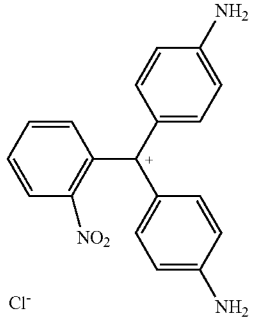

Comparative compound (4)

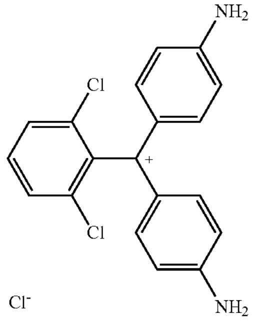

Cyan Ink Preparation Example 1

To a solution mixture of 45 parts of methyl ethyl ketone/45 parts of toluene, 5 parts of polyvinyl butyral resin (DENKA 3000-K; manufactured by DENKI KAGAKU KOGYO KABUSHIKI KAISHA) was added in small portions and dissolved. To the resultant solution, 5 parts of Compound (A3) was added and dissolved, to thereby obtain Cyan ink (C1) for forming a cyan dye layer.

Cyan Ink Preparation Examples 2 to 24

The same procedures as in Cyan ink preparation example 1 were performed except that Compound (A3) in Cyan ink preparation example 1 was changed to a cyan dye or cyan dyes (among compounds according to the present disclosure and Comparative compounds) in Table 1 to obtain Cyan inks (C2) to (C24).

TABLE 1

| Cyan ink | Cyan dye | Mixing ratio |
|---|---|---|
| C1 | A3 | 1:0 |
| C2 | A7 | 1:0 |
| C3 | A11 | 1:0 |
| C4 | A15 | 1:0 |
| C5 | A23 | 1:0 |
| C6 | A25 | 1:0 |
| C7 | A29 | 1:0 |
| C8 | A30 | 1:0 |
| C9 | A31 | 1:0 |
| C10 | A32 | 1:0 |
| C11 | A33 | 1:0 |
| C12 | A34 | 1:0 |
| C13 | A11, B2 | 1:1 |
| C14 | A11, C3 | 1:1 |
| C15 | A25, B2 | 1:1 |
| C16 | A25, C3 | 1:1 |
| C17 | Comparative compound (1) | 1:0 |
| C18 | Comparative compound (2) | 1:0 |
| C19 | Comparative compound (3) | 1:0 |
| C20 | Comparative compound (4) | 1:0 |
| C21 | Comparative compound (1), B2 | 1:1 |
| C22 | Comparative compound (2), B2 | 1:1 |
| C23 | Comparative compound (1), C3 | 1:1 |
| C24 | Comparative compound (2), C3 | 1:1 |

Example 1

As a substrate, a polyethylene terephthalate film having a thickness of 4.5 μm (LUMIRROR (trademark); manufactured by Toray Industries, Inc.) is used. Onto the substrate, Cyan ink (C1) above was applied such that the resultant thickness after dry would be 1 μm, and dried to form a cyan dye layer.

FIGURE is a schematic sectional view of a thermal transfer recording sheet used in Example 1. A thermal transfer recording sheet 1 includes, on a substrate 2, a coloring material layer 3 and a protective layer 4. The coloring material layer 3 includes, in a planar arrangement, the sequence of a yellow dye layer Y, a magenta dye layer M, and a cyan dye layer C.

In the above-described thermal transfer recording sheet including the yellow dye layer Y, the magenta dye layer M, the cyan dye layer C, and the protective layer 4 (color ink KL-36IP for compact photo printer SELPHY CP1200, manufactured by CANON KABUSHIKI KAISHA), the cyan dye layer was cut off. To the region from which the cyan dye layer had been cut off, a cyan dye layer having the same sizes (width, length, and thickness) as those of the cut-off cyan dye layer and formed of Cyan ink (C1) above was bonded, to form a full-color thermal transfer recording sheet. The obtained thermal transfer recording sheet was used in a modified Selphy to transfer an image onto printing paper, to form Image sample (1). The image was printed in cyan alone at an output controlled such that the optical density (O. D.) became 1.0.

The obtained image sample was evaluated as described later. The evaluation results are described in Table 2.

Examples 2 to 16 and Comparative Examples 1 to 8

The same procedures as in Example 1 were performed except that the cyan ink in Example 1 was changed as described in Table 2, to produce thermal transfer recording sheets having cyan dye layers.

As in Example 1, the produced thermal transfer recording sheets were used to produce Image samples (2) to (16) and Comparative image samples (1) to (8), and evaluation was performed as described later. The evaluation results are described in Table 2.

(i) Evaluation of Chroma

Each of the produced image samples was measured using a spectrodensitometer (fluorescent spectrodensitometer FD-7, manufactured by KONICA MINOLTA JAPAN, INC.) to determine chromaticity (L*, a*, b*) in the L*a*b* color system. The following formula was used to calculate chroma (C*).

$$C^*=\sqrt{(a^*)^2+(b^*)^2}$$

The higher the chroma C*, the larger the increase in chroma, hence high chroma. The results are described in Table 2.

The evaluation system is as follows.

A: C* is 45.0 or more.

B: C* is 35.0 or more and less than 45.0.

C: C* is less than 35.0.

(ii) Evaluation of Light Resistance

The image sample was placed into a xenon test apparatus (ATLAS WEATHER-OMETER Ci4000, manufactured by Toyo Seiki Seisaku-sho, Ltd.), and exposed under conditions (illuminance: 0.28 $W/m^2$ at 340 nm, black panel temperature: 40° C., relative humidity: 50%) for 20 hours. The initial optical density is denoted by $OD_0$, O. D. after exposure for 20 hours is denoted by $OD_{20}$, and O. D. remaining percentage is defined as follows.

$$\text{O. D. remaining percentage (\%)}=(OD_{20}/OD_0)\times 100$$

The evaluation system is as follows.

A: 60<O. D. remaining percentage (%)

B: 50<O. D. remaining percentage (%)≤60

C: O. D. remaining percentage (%)≤50

(iii) Evaluation of Dispersibility of Cyan Dye

Each image sample was observed with a phase-contrast microscope (trade name: BX53, manufactured by Olympus Corporation) at a magnification of 20, and evaluated for the dispersibility of the compound.

The evaluation system is as follows.

A: Aggregate of the compound is substantially not observed.

B: Aggregate of the compound is slightly observed.

C: Aggregate of the compound is noticeably observed.

TABLE 2

| | Cyan | Hue | | Evaluation of chroma | | Evaluation of light resistance | | Evaluation of |
|---|---|---|---|---|---|---|---|---|
| | | | | | | O. D. remaining percentage | | |
| | ink | a* | b* | C* | Rank | (%) | Rank | dispersibility |
| Example 1 | C1 | −33.1 | −42.2 | 53.6 | A | 69 | A | A |
| Example 2 | C2 | −28.8 | −52.9 | 60.2 | A | 67 | A | A |
| Example 3 | C3 | −25.3 | −48.5 | 54.7 | A | 63 | A | A |
| Example 4 | C4 | −36.1 | −39.8 | 53.7 | A | 75 | A | A |
| Example 5 | C5 | −37.7 | −43.4 | 57.5 | A | 64 | A | A |
| Example 6 | C6 | −37.5 | −38.8 | 54.0 | A | 62 | A | A |
| Example 7 | C7 | −29.8 | −51.6 | 59.6 | A | 73 | A | A |
| Example 8 | C8 | −31.6 | −50.2 | 59.3 | A | 68 | A | A |
| Example 9 | C9 | −34.2 | −30.3 | 45.7 | A | 61 | A | A |
| Example 10 | C10 | −18.1 | −42.5 | 46.2 | A | 58 | B | A |
| Example 11 | C11 | −19.7 | −45.1 | 49.2 | A | 60 | B | A |
| Example 12 | C12 | −21.4 | −48.1 | 52.6 | A | 62 | A | A |
| Example 13 | C13 | −32.5 | −46.8 | 57.0 | A | 75 | A | A |
| Example 14 | C14 | −18.3 | −46.9 | 50.3 | A | 77 | A | A |
| Example 15 | C15 | −45.2 | −34.6 | 56.9 | A | 69 | A | A |
| Example 16 | C16 | −22.7 | −51.9 | 56.6 | A | 76 | A | A |
| Comparative example 1 | C17 | −11.2 | −21.9 | 24.6 | C | 31 | C | C |
| Comparative example 2 | C18 | −24.6 | −22.1 | 33.1 | C | 27 | C | B |
| Comparative example 3 | C19 | −18.3 | −20.6 | 27.6 | C | 28 | C | C |
| Comparative example 4 | C20 | −23.2 | −22.7 | 32.5 | C | 25 | C | C |
| Comparative example 5 | C21 | −26.2 | −21.9 | 34.1 | C | 53 | B | C |
| Comparative example 6 | C22 | −33.1 | −25.3 | 41.7 | B | 51 | B | C |
| Comparative example 7 | C23 | −13.8 | −32.1 | 34.9 | C | 62 | A | C |
| Comparative example 8 | C24 | −21.9 | −33.9 | 40.4 | B | 56 | B | C |

The present disclosure is not limited to the above-described embodiments. The embodiments can be changed or modified without departing from the spirit and scope of the present disclosure. Thus, in order to make the scope of the present disclosure public, the following Claims are attached.

The present disclosure provides a coloring compound that has high chroma, high light resistance, and high dispersibility.

In addition, use of the coloring compound provides a thermal transfer recording sheet having high chroma and high light resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A coloring compound comprising a structure represented by formula (1-1) or formula (1-2):

formula (1-1)

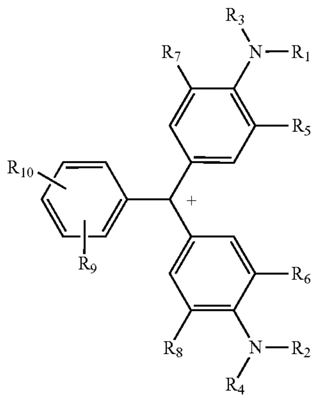

$X^-$, where:

$R_1$ and $R_2$ each independently represents an unsubstituted alkyl group;

$R_3$ and $R_4$ each independently represents a hydrogen atom or an unsubstituted alkyl group;

$R_5$ and $R_6$ each independently represents a hydrogen atom or an unsubstituted alkyl group having 1 to 4 carbon atoms;

$R_7$ and $R_8$ each independently represents an unsubstituted alkyl group having 1 to 4 carbon atoms;

$R_9$ represents a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group;

$R_{10}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group; and $X^-$ represents an anion, wherein in $R_1$ to $R_4$, the unsubstituted alkyl group is an n-butyl group, a 2-ethylhexyl group, or an octyl group;

formula (1-2)

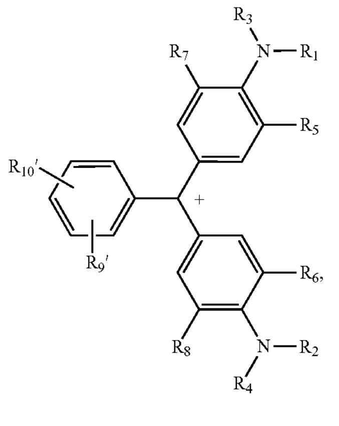

where:

$R_1$ and $R_2$ each independently represents an unsubstituted alkyl group;

$R_3$ and $R_4$ each independently represents a hydrogen atom or an unsubstituted alkyl group;

$R_5$ and $R_6$ each independently represents a hydrogen atom or an unsubstituted alkyl group having 1 to 4 carbon atoms;

$R_7$ and $R_8$ each independently represent an unsubstituted alkyl group having 1 to 4 carbon atoms;

$R_9'$ represents —$SO_3^-$; and $R_{10}'$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group, wherein in $R_1$ to $R_4$, the unsubstituted alkyl group is an n-butyl group, a 2-ethylhexyl group, or an octyl group.

2. The coloring compound according to claim 1, wherein $R_1$ and $R_2$ in the formula (1-1) and the formula (1-2) represent identical alkyl groups.

3. The coloring compound according to claim 1, comprising the structure represented by the formula (1-2), which has a moiety B constituted by $R_{9'}$, $R_{10'}$, and a benzene ring to which $R_{9'}$ and $R_{10'}$ bond, wherein the moiety B has a structure represented by formula (7):

formula (7)

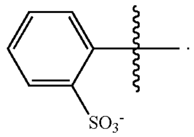

4. A thermal transfer recording sheet comprising a substrate and a coloring material layer on the substrate, wherein the coloring material layer comprises a yellow dye layer including a yellow dye, a magenta dye layer including a magenta dye, and a cyan dye layer including a cyan dye, and wherein the cyan dye includes a coloring compound including a structure represented by formula (1-2) or formula (1-2):

formula (1-1)

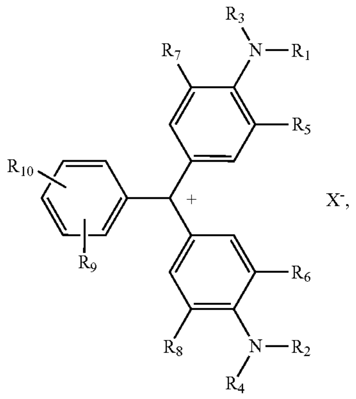

where:

$R_1$ and $R_2$ each independently represents an unsubstituted alkyl group;

$R_3$ and $R_4$ each independently represents a hydrogen atom or an unsubstituted alkyl group;

$R_5$ and $R_6$ each independently represents a hydrogen atom or an unsubstituted alkyl group having 1 to 4 carbon atoms;

$R_7$ and $R_8$ each independently represents an unsubstituted alkyl group having 1 to 4 carbon atoms;

$R_9$ represents a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group;

$R_{10}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group; and $X^-$ represents an anion, wherein in $R_1$ to $R_4$, the unsubstituted alkyl group is an n-butyl group, a 2-ethylhexyl group, or an octyl group;

formula (1-2)

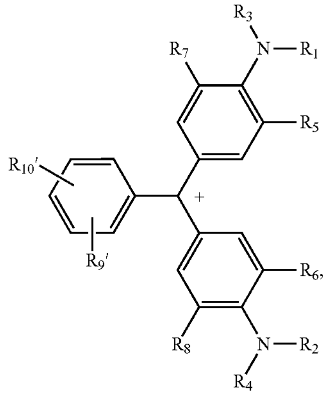

where:

$R_1$ and $R_2$ each independently represents an unsubstituted alkyl group;

$R_3$ and $R_4$ each independently represents a hydrogen atom or atom, an unsubstituted alkyl group;

$R_5$ and $R_6$ each independently represents a hydrogen atom or an unsubstituted alkyl group having 1 to 4 carbon atoms;

$R_7$ and $R_8$ each independently represent an unsubstituted alkyl group having 1 to 4 carbon atoms;

$R_{9'}$ represents $—SO_3^-$; and $R_{10'}$ represents a hydrogen atom, a halogen atom, a nitro group, a sulfo group, a sulfonic acid ester group, a sulfonamide group, a sulfonic acid salt group, a benzenesulfonyl group, a trifluoromethylsulfonyl group, or a perfluoroalkyl group, wherein in $R_1$ to $R_4$, the unsubstituted alkyl group is an n-butyl group, a 2-ethylhexyl group, or an octyl group.

5. The thermal transfer recording sheet according to claim 4, wherein the cyan dye further includes at least one compound selected from the group consisting of compounds represented by formulae (2) and (3):

formula (2)

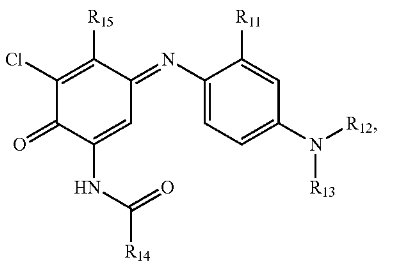

where $R_{11}$ to $R_{15}$ each independently represents an alkyl group, an aryl group having a substituent, or an unsubstituted aryl group; and formula (3)

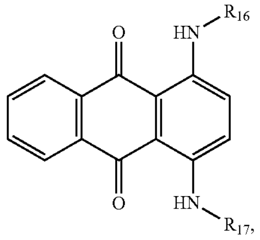

where $R_{16}$ and $R_{17}$ each independently represents an alkyl group, an aryl group having a substituent, or an unsubstituted aryl group.

6. The coloring compound according to claim 1, comprising the structure represented by the formula (1-1), which has a moiety A constituted by $R_9$, $R_{10}$, and a benzene ring to which $R_9$ and $R_{10}$ bond, wherein the moiety A has a structure selected from the group consisting of structures represented by formulae (4) and (5):

formula (4)

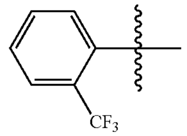

formula (5)

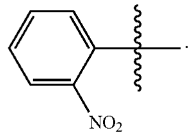

7. The thermal transfer recording sheet according to claim 4, comprising the structure represented by formula (1-1), which has a moiety A constituted by $R_9$, $R_{10}$, and a benzene ring to which $R_9$ and $R_{10}$ bond, wherein the moiety A has a structure selected from the group consisting of structures represented by formulae (4) and (5):

formula (4)

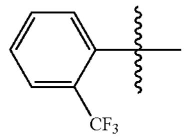

formula (5)

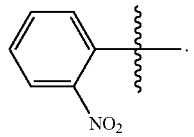

8. The coloring compound according to claim 1, comprising the structure represented by formula (1-1), which has a moiety A constituted by $R_9$, $R_{10}$, and a benzene ring to which $R_9$ and $R_{10}$ bond, wherein the moiety A has a structure selected from the group consisting of structures represented by formulae (4) to (6):

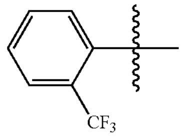
formula (4)
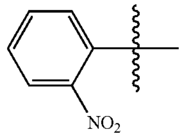
formula (5)
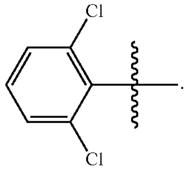
formula (6)
* * * * *

UNITED STATES PATENT AND TRADEMARK OFFICE

CERTIFICATE OF CORRECTION

PATENT NO. : 11,958,978 B2
APPLICATION NO. : 16/879035
DATED : April 16, 2024
INVENTOR(S) : Ai Hayakawa et al.

It is certified that error appears in the above-identified patent and that said Letters Patent is hereby corrected as shown below:

On the Title Page (73), Assignee:
"Canon Kabuskiki Kaisha", Tokyo (JP)" should read --Canon Kabushiki Kaisha, Tokyo (JP)--.

Signed and Sealed this
Fourteenth Day of May, 2024

Katherine Kelly Vidal

Katherine Kelly Vidal
*Director of the United States Patent and Trademark Office*